(12) United States Patent
Boinais et al.

(10) Patent No.: US 11,241,987 B2
(45) Date of Patent: Feb. 8, 2022

(54) MULTI-HEIGHT ROTATABLE VEHICLE CONSOLE

(71) Applicant: Faurecia Interior Systems, Inc., Auburn Hills, MI (US)

(72) Inventors: Olivier Boinais, West Bloomfield, MI (US); Benjamin Louis, Bloomfield Hills, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 179 days.

(21) Appl. No.: 16/780,157

(22) Filed: Feb. 3, 2020

(65) Prior Publication Data

US 2021/0237633 A1      Aug. 5, 2021

(51) Int. Cl.
*B60N 2/75* (2018.01)

(52) U.S. Cl.
CPC ............. *B60N 2/793* (2018.02); *B60N 2/773* (2018.02)

(58) Field of Classification Search
CPC ................................ B60N 2/793; B60N 2/773
USPC ............................ 296/37.8, 1.09, 24.34, 153
See application file for complete search history.

(56) References Cited

U.S. PATENT DOCUMENTS

| | | | | |
|---|---|---|---|---|
| 4,568,117 A * | 2/1986 | McElfish | ............... | B60N 3/102 224/280 |
| 5,085,481 A * | 2/1992 | Fluharty | ................... | B60R 7/04 296/37.14 |
| 5,636,899 A * | 6/1997 | Schiff | ...................... | B60N 2/77 297/411.36 |
| 5,823,599 A * | 10/1998 | Gray | ..................... | B60N 3/002 296/37.8 |
| 7,111,883 B1 * | 9/2006 | Patel | ........................ | B60R 7/04 296/24.34 |
| 7,445,261 B2 * | 11/2008 | Joler | ........................ | B60R 7/04 296/24.34 |
| 9,561,746 B2 | 2/2017 | Parlow et al. | | |
| 9,789,824 B1 * | 10/2017 | Juarez Corona | .......... | B60R 1/00 |
| 10,023,088 B2 * | 7/2018 | Anderson | ............. | B60N 2/793 |
| 10,421,380 B2 * | 9/2019 | Keenan | .................. | B60N 3/002 |
| 10,501,020 B1 * | 12/2019 | Hickman guevara | .... | B60R 7/04 |
| 10,829,054 B2 * | 11/2020 | Vanel | ........................ | B60R 7/04 |
| 2010/0090491 A1 * | 4/2010 | Hipshier | ................... | B60R 7/04 296/24.34 |
| 2014/0300125 A1 * | 10/2014 | Brinas | ....................... | B60R 7/04 296/24.34 |
| 2016/0121767 A1 * | 5/2016 | Dyle | ....................... | B60N 2/753 296/37.8 |
| 2019/0047454 A1 * | 2/2019 | Han | ......................... | B60R 7/04 |
| 2021/0261060 A1 * | 8/2021 | Schwarz | .................. | B60D 1/52 |
| 2021/0262194 A1 * | 8/2021 | McConoughey | ........ | B60N 2/77 |

FOREIGN PATENT DOCUMENTS

DE           10258018 A1     7/2004

* cited by examiner

*Primary Examiner* — D Glenn Dayoan
*Assistant Examiner* — E Turner Hicks
(74) *Attorney, Agent, or Firm* — Reising Ethington P.C.

(57) ABSTRACT

A vehicle console has a rotatable portion with opposite sides that are different distances from a rotational axis. Rotation by 180 degrees from a first position to a second position changes the vertical position of a beam portion of the console. One side can have a particular look or functionality, and the opposite side can have a different look or functionality thereby giving users more choices while occupying the vehicle cabin.

14 Claims, 2 Drawing Sheets

MULTI-HEIGHT ROTATABLE VEHICLE CONSOLE

TECHNICAL FIELD

The present disclosure is related generally to vehicle interiors and, more particularly, to vehicle interior components that are convertible from one state to another.

BACKGROUND

Vehicle consoles are commonly employed adjacent to individual seats in a vehicle passenger cabin, such as between driver and passenger seats in a front row of seating or between passenger seats in another row of seating. Such consoles can provide armrests or other conveniences for vehicle occupants.

In one example, U.S. Pat. No. 9,789,824 to Corona describes a center console with a cylindrical shell and a spindle arranged along an axis of the shell. Radial dividers are attached to the spindle to subdivide the space within the shell into individual compartments. The spindle rotates to present a desired compartment at an opening in the shell to place items into or retrieve items from the compartment. They system is programmable so a user can assign each compartment to a particular item to be stored and thereby retrieve that item by electronic selection of the associated compartment.

SUMMARY

An illustrative console for use in a vehicle includes a beam portion having oppositely facing first and second sides and being rotatable about an axis between a first position and a second position. In the first position, the first side is an upwardly facing side. In the second position, the second side is the upwardly facing side. The first and second sides are radially offset from the axis by different amounts such that a vertical position of the upwardly facing side is higher in the first position than in the second position.

In various embodiments, the axis is configured to extend in a longitudinal direction of the vehicle when installed in the vehicle.

In various embodiments, the beam portion is configured to extend in a longitudinal direction of the vehicle when installed in the vehicle.

In various embodiments, the beam portion extends between a first end section and a second end section and is configured to be rotationally supported at one of said end sections so that the beam portion is spaced over a floor of the vehicle when installed in the vehicle.

In various embodiments, the beam portion is configured to be rotationally supported at both of said end sections when installed in the vehicle.

In various embodiments, the console includes a detent mechanism that holds the beam portion in each position.

In various embodiments, the first and second positions are the only two rotational positions at which the beam portion is held in place.

In various embodiments, rotation of the beam portion between the first and second positions is motorized.

In various embodiments, the console includes a functional component located along one of the sides of the beam portion and accessible to a user when said one of the sides is the upwardly facing side.

In various embodiments, the functional component is an electrically powered component that is operable when said one of the sides is the upwardly facing side.

In various embodiments, the electrically powered component is not operable when said one of the sides is not the upwardly facing side.

In various embodiments, the beam portion includes a body and a functional module removably attached to the body such that a different functional module can be attached to the body at the same location.

In various embodiments, the console includes an electrical connector affixed to the body, and at least one functional module is an electrically powered component that is powered via the electrical connector when attached to the body.

In various embodiments, the beam portion comprises a body and a decorative trim piece removably attached to the body such that a different decorative trim piece can be attached to the body at the same location.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a multi-height vehicle console in which a rotatable component allows the console to be reconfigured between relatively high and low positions depending on the needs of individual vehicle occupants. The console can additionally provide different functionalities in each position to offer yet further options to vehicle occupants. Functional and/or decorative components can be modular and interchangeable. The reconfigurable console is particularly useful in the modern era, in which autonomous vehicles and ride sharing appear to be growing trends.

Figure 1:
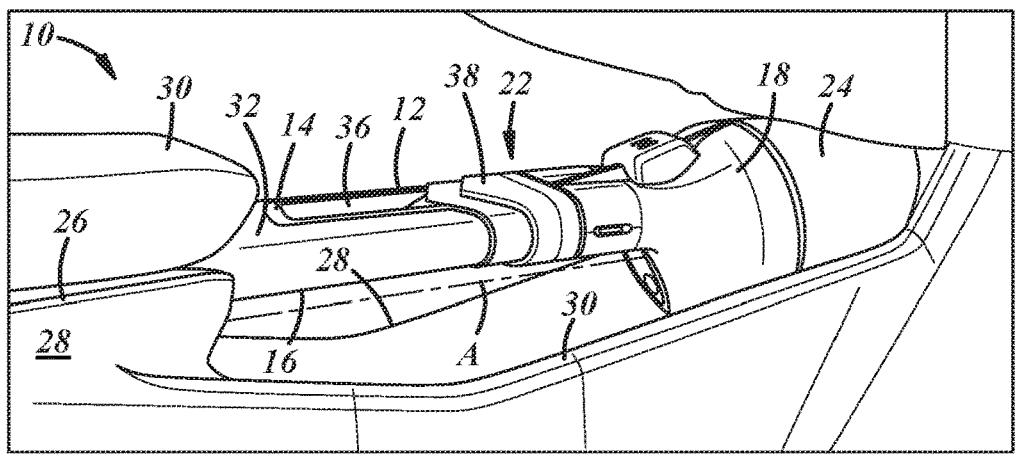
FIG. 1 is a perspective view of a vehicle console with a beam portion in a first position.
Figure 2:
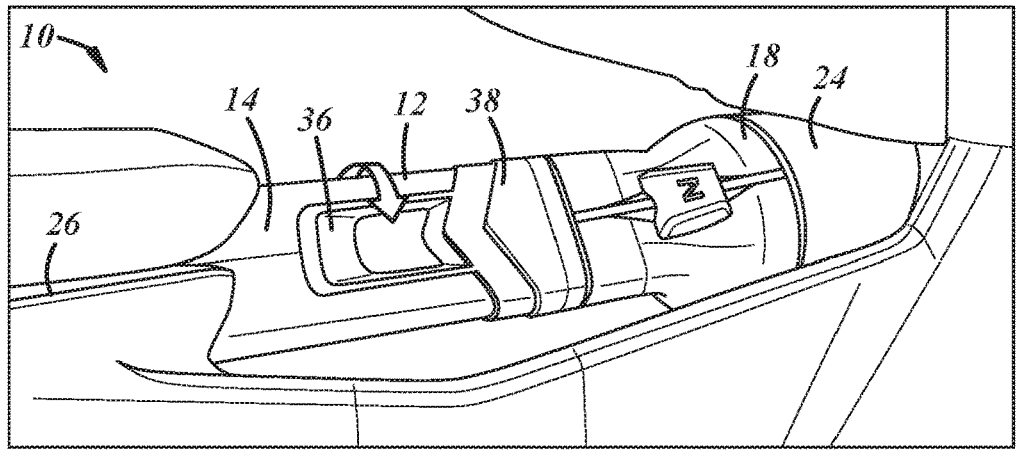
FIG. 2 is a perspective view of the vehicle console of FIG. 1 illustrating the beam portion during rotation toward a second position.
Figure 3:
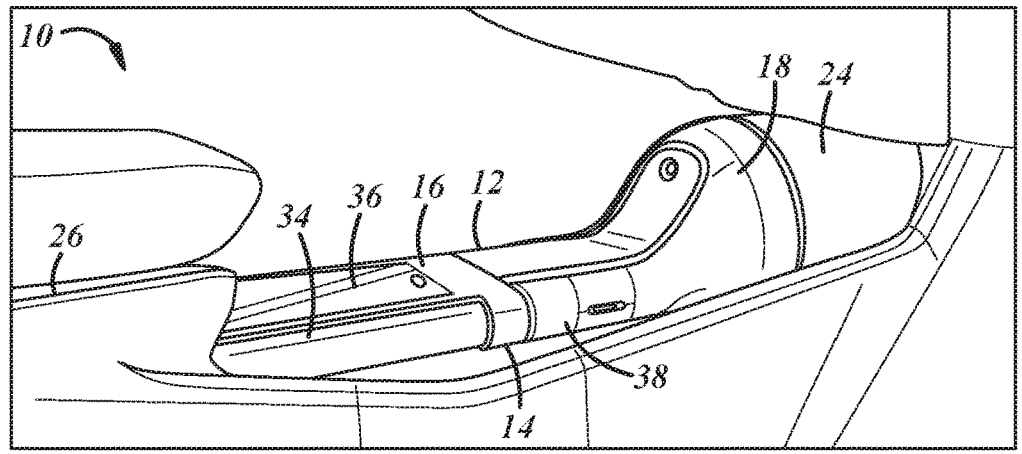
FIG. 3 is a perspective view of the vehicle console of FIG. 1 with the beam portion in the second position.

FIGS. 1-3 illustrate an example of a reconfigurable vehicle console 10. Each figure is a perspective view of the console as viewed from the righthand side of the vehicle cabin. A longitudinal direction of the vehicle is parallel with the x-axis, a transverse direction is parallel with the y-axis, and the z-axis is vertical. The console 10 is a center console of the type that extends longitudinally between transversely spaced seats in the vehicle cabin. In the figures, the front (F) of the vehicle in which the console is installed is toward the right and the rear (R) of the vehicle is toward the left.

The console 10 includes a beam portion 12 having oppositely facing first and second sides 14, 16. The beam portion 12 is rotatable about an axis (A) between a first position and a second position. FIG. 1 illustrates the first position, in which the first side 14 is an upwardly facing side. FIG. 3 illustrates the second position, in which the second side 16 side 14 is the upwardly facing side. FIG. 2 illustrates an intermediate position during movement from the first position to the second position. The first and second sides of the beam portion 12 are radially offset from the rotational axis by different amounts such that a vertical position of the upwardly facing side is higher in the first position than in the second position. The rotational axis (A) and the beam portion 12 extend in the longitudinal direction (X) when installed in the vehicle, in this example, though other orientations are possible.

Figure 4:
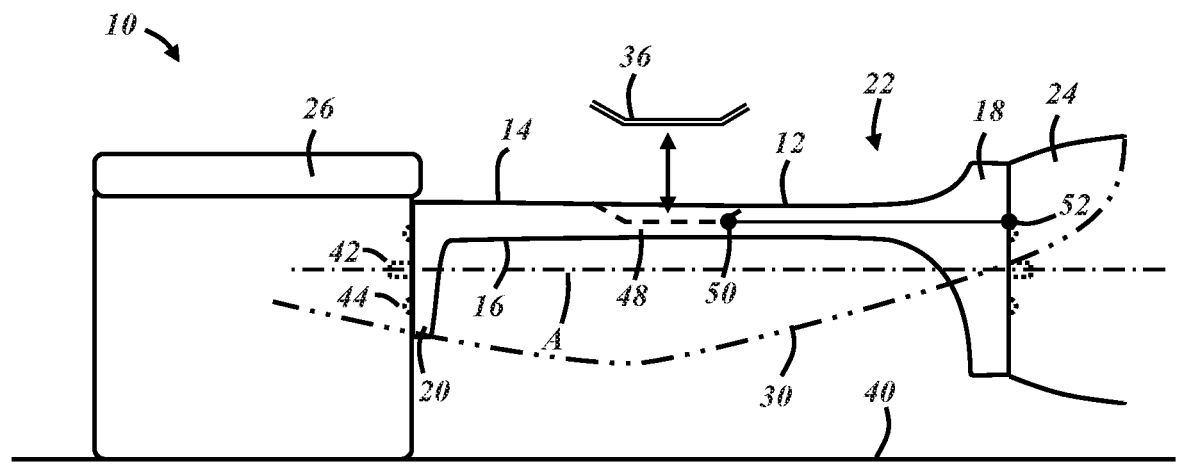
FIG. 4 is a schematic side view of a vehicle console with the beam portion in the first position.
Figure 5:
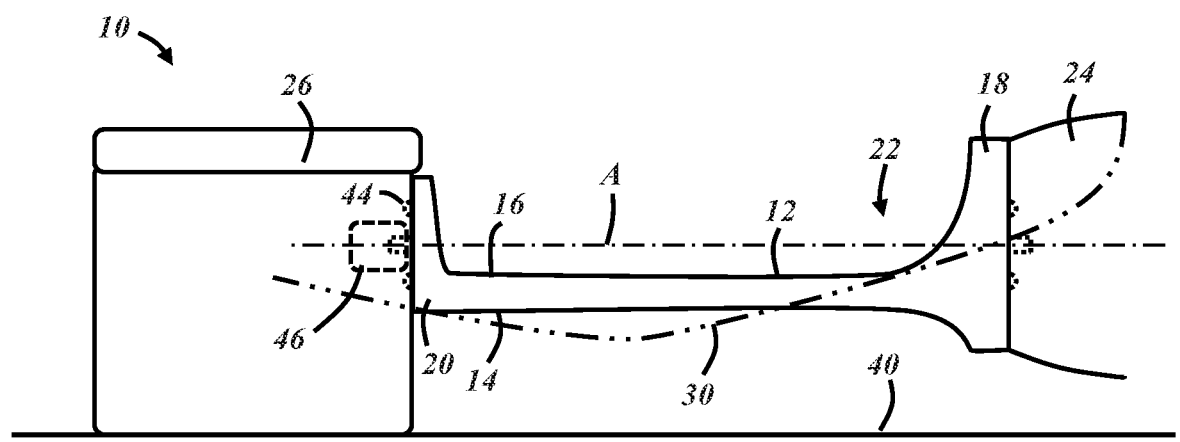
FIG. 5 is a schematic side view of the vehicle console of FIG. 4 with the beam portion in the second position.

The beam portion 12 extends between a first or front end section 18 and a second or rear end section 20. The rear end section 20 is not shown in FIGS. 1-3, but an example is illustrated in FIGS. 4-5. Together with the beam portion 12, the front and rear end sections 18, 20 may form a rotatable portion 22 of the console 10. The console 10 may also include non-rotatable components, such as front and rear supports 24, 26 and sidewalls 28, 30. In this case, the rear support 26 includes a base 28 and a top 30. The top 30 may be an armrest or a moveable lid for accessing a storage area in the base. In some embodiments, the console 10 consists of the rotatable portion 22, and the supports 24, 26 are provided by some other part of the vehicle. A lateral space between opposing sidewalls 28, 30 may define a storage space or a packaging space for other vehicle components. In some embodiments, the sidewalls 28, 30 are omitted and the space beneath the beam portion 12 is an open space.

The beam portion 12 may have certain characteristics of a beam in that it may be generally straight with substantially parallel opposite sides 14, 16 and may be unsupported along most or all of its length away from the end sections 18, 20. It may be useful to describe the beam portion 12 as being defined between reference surfaces that are vertically spaced apart when in the first and second positions. For instance, when referring to relative distances of the opposite first and second sides 14, 16 of the beam portion 12 from the rotational axis (A), each opposite side may be said to have a corresponding reference surface 32, 34. Each reference surface 32, 34 is a nominal surface extending the full length of the beam portion 12 from which other recessed or relief surfaces deviate. In this example, if all decorative and functional features are removed so that the beam portion 12 is a simple plank with smooth and uninterrupted surfaces. The references surfaces 32, 34 are parallel planar surfaces that partly define such a plank. Recesses are formed into these reference surfaces to accommodate functional components 36 of the console—i.e., a storage tray on the first side 14 and a wireless charging unit on the second side 16—and decorative trim pieces 38 protrude from the reference surfaces. But the basic shape and packaging envelope of the beam portion 12 is defined between the reference surfaces 32, 34.

Indeed, in some embodiments, there are no functional components 36 along the beam portion 12, and the beam portion forms an adjustable height arm rest or horizontal utility surface of which the height is adjusted between high and low positions via rotation of the beam portion about an offset rotational axis (A). In some embodiments, each of the opposite sides 14, 16 of the beam portion 12 is always radially spaced from the rotational axis (A) in the same direction as the other, as is shown more clearly in the schematic side views of FIGS. 4 and 5.

FIG. 4 shows the rotatable portion 22 of the console 10 in the first position with the first side 14 as the upwardly facing side and the second side 16 as a downwardly facing side with both sides 14, 16 positioned above the rotational axis (A). FIG. 5 shows the rotatable portion 22 of the console 10 in the second position with the second side 16 as the upwardly facing side and the first side 14 as the downwardly facing side with both sides 14, 16 positioned below the rotational axis (A). A sidewall 30 of FIGS. 1-3 is shown in phantom in FIGS. 4 and 5 to illustrate how accessibility to the space beneath the beam portion 12 can vary depending on the rotational and vertical position of the beam portion.

The beam portion 12 extends between the first and second end sections 18, 20 and is rotationally supported over a floor 40 of the vehicle in which the console 10 is installed. FIGS. 4 and 5 depict each end section 18, 20 coupled with a respective one of the supports 24, 26 via a pivot joint 42, such as a pin-in-aperture joint. Each support 24, 26 may be affixed to the floor 40 or be made as an integral part of the floor or other vehicle structure. Other types of rotational support are possible. In some embodiments, the beam portion 12 is supported at only one end section in the manner of a cantilever.

Rotation between the first and second positions may be either manual, motorized, and/or automatic. In the illustrated example, the console 10 includes a detent mechanism 44 at each end section 18, 20, such as protrusions extending from vertical faces of the end sections configured to mate with recesses in the respective supports 24, 26. Such a detent mechanism 44 can be configured to provide a user-ascertainable rotational stop in embodiments in which rotation is manual and to hold the beam portion 12 in one of the two illustrated positions. The two illustrated positions of the beam portion 12—i.e., the high position of FIGS. 1 and 4 and the low position of FIGS. 3 and 5—may be the only two rotational positions at which the beam portion is configured to stop and be held in place. Other types of manual lock-and-release mechanisms may be employed such as manual latches configured to latch the rotatable portion 22 of the console in place at the desired rotational positions.

An optional motor 46 is depicted in FIG. 5 such that rotation of the beam portion 12 between the first and second positions can be motorized. The motor 46 can be located in one of the supports 24, 26 along the rotational axis as shown. In other embodiments, the motor can be located away from the rotational axis and a transmission (e.g., a gear or pulley system) can transmit motor motion to the rotatable portion of the console 10. In motorized embodiments, the detent mechanism 44 may be omitted. The motor 46 may for example be of the servo type and be locked at one of two pre-programmed positions. A user interface such as a switch or a touch screen may be provided on the console or elsewhere to allow a user to select from the available positions. A controller may be configured to receive user input and to rotate the beam portion 12 to the desired position accordingly. In other embodiments, the position of the beam portion may be selected and obtained automatically without user input. For instance, the vehicle in which the console 10 is installed may have a driver mode and an autonomous mode, and when the vehicle is in the autonomous mode, a controller may be configured to automatically move the beam portion 12 to the position corresponding to the autonomous mode.

As mentioned above, the console 10 may include one or more functional components 36 located along one of the sides 14, 16 of the beam portion 12 and accessible to a user along the upwardly facing side. As used herein, a functional component is any component that is more than merely a horizontal surface and provides some beneficial utility to a user other than aesthetics. Some examples include a cup holder, a storage bin or tray, a control switch, or a phone/tablet holder. Any electrically powered component is also considered a functional component, such as a wireless device charger, a touch screen, or an illumination element.

In the example of FIG. 4, the functional component 36 is an electrically powered component that is operable when the first side 14 of the beam portion 12 is the upwardly facing side. The functional component 36 is also part of an interchangeable functional module that is operable when at the upwardly facing side but not operable when at the downwardly facing side. The module containing the electrically powered functional component 36 is removably attached to a body 48 of the beam portion 12. As used herein, a removably attached component is one that can be removed from the body without damaging either the body or the component. Threaded fasteners, magnetic fasteners, and certain snap features are some examples of removable attachments. A removably attached module can be removed from the body 48 of the beam portion 12 and replaced with a different module at the same location. For instance, snap features on both modules may be located and arranged identically to fit together with the body 48 of the beam portion 12.

In the case of an electrically powered component or module, the body 48 of the beam portion 12 may be equipped with an electrical connector 50, shown schematically in FIG. 4. The connector 50 is located so that the interchangeable modules can each receive a portion of the connector when removably attached to the body 48 to power the functional component 36. In the particular example of FIG. 4, the connector 50 is electrically connected with an electrical contact 52 at the interface between the end section 18 and the support 24. The electrical contact 52 may, for example, be at a protrusion of the detent mechanism 44 and placed into contact with another electrical contact at a corresponding recess in the face of the support 24 when the beam portion 12 in in the first position. The electrical contact of the support 24 may be stationary such that, when the rotatable portion 22 of the console 10 is rotated away from the first position, the electrical connection at the interface is interrupted so that the functional component is no longer powered when moved away from the first position. This is of course only one example of a manner in which functional electrical components of the console can be selectively powered. For instance, all functional components of the console may be connected with a power source at all times with the power controlled by a separate controller or user switches. Non-powered functional modules may also be configured to be interchangeable with electrically powered ones.

As mentioned above, the console 10 may include one or more decorative trim pieces 38 (FIGS. 1-3). As used herein, a decorative trim piece is formed separately from the body 48 or other underlying structure of the beam portion 12 and attached to the body 48. A decorative trim piece may be purely decorative, offering only aesthetic qualities such as a particular color, shape, or texture—i.e., it is not a functional component. Some examples include a chrome bezel or a padded leather insert. Decorative trim pieces 38 may also be interchangeable in the same or similar manner as the above-described modules i.e., they may be removably attached to the body 48 of the beam portion 12 and replaceable with a different decorative trim piece at the same location.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A console for use in a vehicle, comprising:
    a beam portion having oppositely facing first and second sides and being rotatable about an axis between a first position, in which the first side is an upwardly facing side, and a second position, in which the second side is the upwardly facing side,
    wherein the first and second sides are radially offset from the axis by different amounts such that a vertical position of the upwardly facing side is higher in the first position than in the second position.

2. The console of claim 1, wherein the axis is configured to extend in a longitudinal direction of the vehicle when installed in the vehicle.

3. The console of claim 1, wherein the beam portion is configured to extend in a longitudinal direction of the vehicle when installed in the vehicle.

4. The console of claim 1, wherein the beam portion extends between first and second end sections and is configured to be rotationally supported at one of said end sections so that the beam portion is spaced over a floor of the vehicle when installed in the vehicle.

5. The console of claim 4, wherein the beam portion is configured to be rotationally supported at both of said end sections when installed in the vehicle.

6. The console of claim 1, further comprising a detent mechanism that holds the beam portion in each position.

7. The console of claim 1, wherein the first and second positions are the only two rotational positions at which the beam portion is held in place.

8. The console of claim 1, wherein rotation of the beam portion between the first and second positions is motorized.

9. The console of claim 1, further comprising a functional component located along one of the sides of the beam portion and accessible to a user when said one of the sides is the upwardly facing side.

10. The console of claim 9, wherein the functional component is an electrically powered component that is operable when said one of the sides is the upwardly facing side.

11. The console of claim 10, wherein the electrically powered component is not operable when said one of the sides is not the upwardly facing side.

12. The console of claim 1, wherein the beam portion comprises a body and a functional module removably attached to the body such that a different functional module can be attached to the body at the same location.

13. The console of claim 12, further comprising an electrical connector affixed to the body, wherein at least one of the functional modules is an electrically powered component that is powered via the electrical connector when attached to the body.

14. The console of claim 1, wherein the beam portion comprises a body and a decorative trim piece removably attached to the body such that a different decorative trim piece can be attached to the body at the same location.

\* \* \* \* \*